Feb. 8, 1944.       C. E. GARDNER       2,341,374
PLANT SHIPPING CONTAINER
Filed March 17, 1941       2 Sheets-Sheet 2
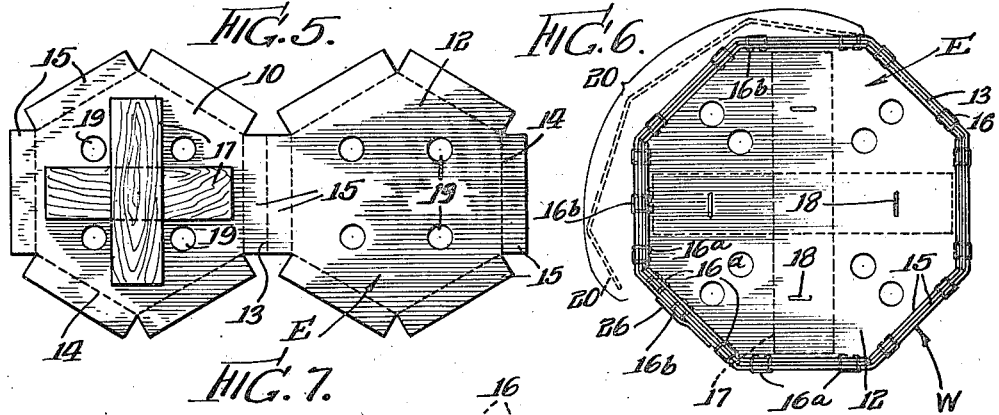
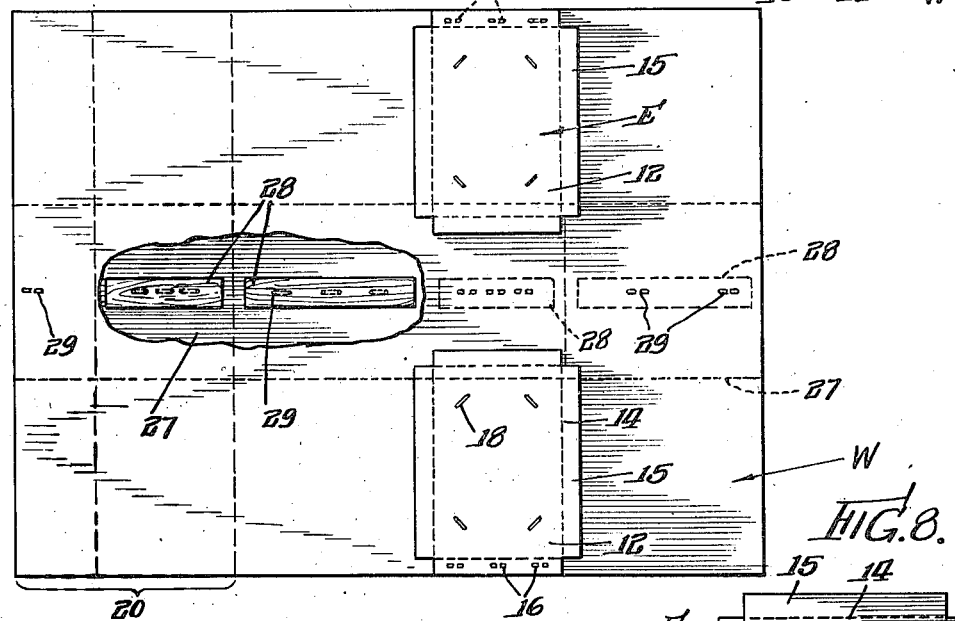
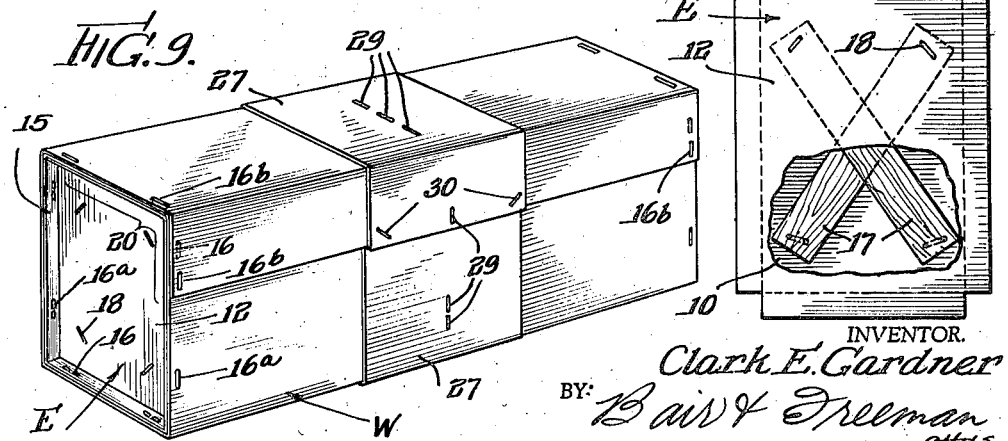
INVENTOR.
Clark E. Gardner
BY Bair & Freeman
attys.

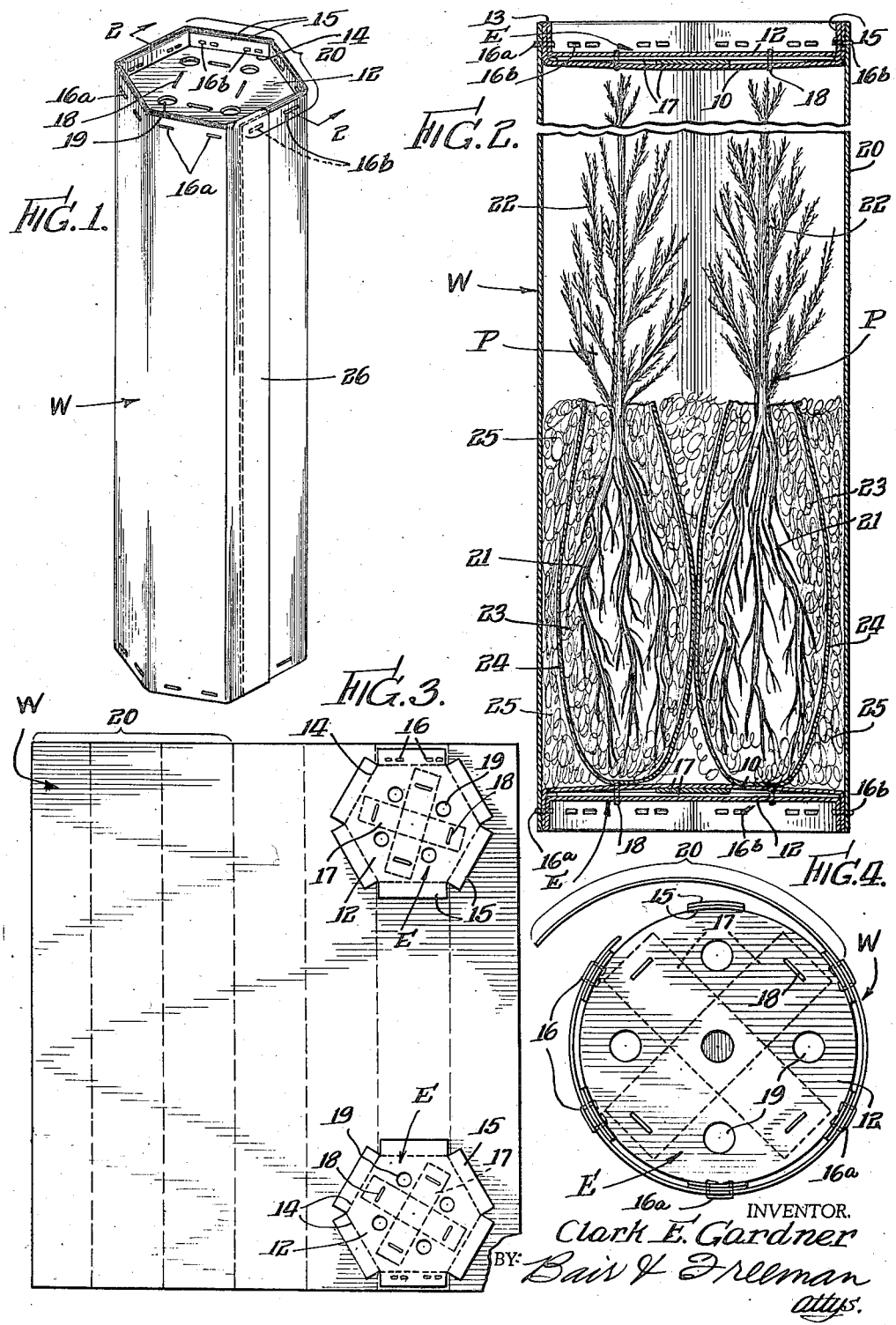

Patented Feb. 8, 1944

2,341,374

UNITED STATES PATENT OFFICE 2,341,374

PLANT SHIPPING CONTAINER

Clark E. Gardner, Osage, Iowa

Application March 17, 1941, Serial No. 383,805

2 Claims. (Cl. 229—23)

My invention has to do with a shipping container for live plants and the like which is inexpensive to manufacture, yet strong and light in construction.

One object of the invention is to provide a container which may be made mostly of cardboard or the like, but which is so fabricated that a maximum of strength, together with a minimum of weight may be secured.

Another object is to provide a container which has ventilating openings so arranged that they do not weaken the construction, so that the container has a maximum of resistance to denting, bending and other strains encountered during shipping of the containers with plants contained therein.

A further object is to provide a container which is light in weight so that it is feasible to ship plants by parcel post at a cost which is not prohibitive.

A further object is to provide a container wherein the roots and their wrapping may be efficiently held and compressed to prevent any longitudinal movement of the plants in the container, yet the foliage of the plants is not damaged in any way nor compressed, and the container has sufficient strength to prevent its collapse around the foliage. The looseness of the foliage permits ready ventilation through the vent openings to keep the plants from overheating and rotting while en route in the mails.

A further object is to provide a shipping container which may be shipped in flat, knocked-down condition, thus requiring a minimum of shipping space, and which may be readily assembled by power or hand stapling machines at the point of packing, it being possible for a single worker to assemble between 800 and 1000 containers per day.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 1 is a perspective view of a plant shipping container embodying my invention.

Figure 2 is a vertical sectional view thereof, as taken on the line 2—2 of Figure 1.

Figure 3 is a flat layout view of the container in its knocked-down form prior to being made up at the point of use.

Figure 4 is an end view of a modified form of container wherein the container is in the form of a round tube instead of a hexagonal tube.

Figure 5 is a layout view of one of the end members, consisting of a pair of sheets and a pair of crossed reinforcing strips.

Figure 6 is an end view of a container which has an octagonal cross section.

Figure 7 is a layout view similar to Figure 3, showing a rectangular container.

Figure 8 is an enlarged plan view of one of the end members for the container of Figure 7.

Figure 9 shows the container of Figure 7 made up closed and stapled.

On the accompanying drawings I have used the reference character W to indicate generally a tubular wall, and E, end members for the wall W. The wall W is made of cardboard or the like, of suitable thickness depending upon the size of the container, and may be made of two thicknesses of cardboard if necessary or desirable.

Each end member E, as shown in Figures 3 and 5, consists of a pair of sheets 10 and 12, which may be connected together as at a scored line 13. The sheets 10 and 12 are of the desired shape such as hexagonal, as shown in Figure 5, or round as shown in Figure 4. Any desired shape obviously may be employed. Scored lines 14 define the extent of each sheet 10 and 12 and beyond the scored lines flanges 15 are provided. The flanges 15 are adapted to be bent at right angles to the plane of the sheets 10 and 12, and the sheets are folded along the line 13 with the flanges 15 parallel to each other and providing double thickness, as illustrated in Figure 2.

A pair of staples 16 are used to secure each end member E to the wall member W, as shown in Figure 3, so that the assembly shown in this figure may be shipped in knocked-down, compact condition. The shipping containers are assembled at the point of use by rolling the wall W around the end members after the end members are bent up to a position at right angles to the wall W, and some of the remaining flanges are stapled to the wall, as indicated at 16ª. For instance, where six flanges are provided, three additional flanges may be stapled in addition to the initial flange having the staple 16, thus leaving one side of the container open for insertion of the plants.

The end members E further include reinforcing strips 17 which are preferably made of wood with the grain extending lengthwise. The strips are crossed as shown in Figure 5, and the sheets 10 and 12 are then folded at 13 and staples 18 extended through the sheets and the reinforcing strips. The strips are thus effectively held against dislocation and in their crossed relation provide a strong arch support for the end members E. The wall W being of tubular formation, has considerable inherent strength when the container is closed.

For ventilating the plants within the container, openings 19 are so located with respect to the reinforcing strip 17 that they are not closed by any parts of the strips, and the strips effectively reinforce the entire end member, so that it has considerable strength in spite of the openings 19 being cut from the material of the sheets 10 and 12. On larger end members such as shown in Figure 6, the number of ventilating openings may be increased.

After the container has been made up as described, the portion indicated at 20 in Figures 3 and 4 constitutes an openable flap so that plants P may be placed in the container. The plants P include roots 21 and foliage 22, as shown in Figure 2, with a root wrapping 23 of moist cypress excelsior or the like surrounding the roots. A wax paper wrapping 24 is then provided. To compact the roots and their wrappings in the container, additional excelsior as at 25 may be inserted before closing the container. The container is then closed and staples 16ᵇ inserted and clinched to retain the container closed. Finally, a strip of gummed paper 26 is secured along the outer edge of the flap to retain it in sealed position.

In Figures 7, 8 and 9 I have shown a rectangular container having essentially the same features of construction as described in connection with Figures 1 and 6. The ventilating openings 19 have been omitted and a reinforcing band 27 is made of cardboard similar to the wall member W and the end members E, and between the band and the wall, reinforcing strips 28 are provided. These likewise may be made of wood with the grain running lengthwise and may be secured in position by staples 29. After the container is packed and closed two additional staples 30 may be passed through the flap 20, its reinforcing strip 27 and the opposite end of the reinforcing strip 27 by a stapling machine to secure the central portion of the flap in position. The reinforcing band 27 and the strips 28 effectively prevent collapse of the diaphragm-like walls of the rectangular container at an advantageous point substantially midway between the ends of the container. The elements 27, 28 and 29 add but very little weight to the container, yet aid greatly in its resistance to collapse.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A plant shipping container comprising a pair of polygonal shaped end members and a tubular wall member spanning the distance between said end members, each of said end members comprising a pair of sheets of material having each a flange at each side of the polygon and secured through said flanges to said tubular wall member adjacent the ends thereof, a pair of thin, flat reinforcing strips crossed in each end member between said pair of sheets, both of said pair of sheets lying in contact with said reinforcing strips and staples through said pairs of sheets and through said reinforcing strips adjacent the ends of the strips.

2. A plant shipping container comprising a pair of end members and a tubular wall, each of said end members comprising a pair of sheets, each sheet of said pair having outwardly directed flanges secured in double relation to said tubular wall adjacent the ends thereof, and a pair of elongated crossed reinforcing strips in each end member between said pair of sheets, said sheets both being against said strips and the edges of said end members where they are bent to form said flanges being positioned with relation to each other so that one bend lies closely within the other.

CLARK E. GARDNER.